US007114107B2

(12) United States Patent
Thiele et al.

(10) Patent No.: US 7,114,107 B2
(45) Date of Patent: Sep. 26, 2006

(54) METHOD FOR THE DYNAMIC CONTROL OF THE CHANNEL USE OF A TRANSMISSION CHANNEL AND A LOAD GENERATOR FOR SENDING A TEST SEQUENCE

(75) Inventors: Ingo Thiele, Berlin (DE); Carsten Wiethoff, Berlin (DE)

(73) Assignee: Tektronix International Sales GmbH, Schaffhausen (CH)

( * ) Notice: Subject to any disclaimer, the term of this patent is extended or adjusted under 35 U.S.C. 154(b) by 373 days.

(21) Appl. No.: 10/456,219

(22) Filed: Jun. 4, 2003

(65) Prior Publication Data

US 2003/0229830 A1    Dec. 11, 2003

(30) Foreign Application Priority Data

Jun. 6, 2002    (EP)    ................................. 02012632

(51) Int. Cl.
*G01R 31/28* (2006.01)
*G01R 31/08* (2006.01)

(52) U.S. Cl. .................. 714/712; 370/241; 714/43; 714/715; 375/224

(58) Field of Classification Search .................... None
See application file for complete search history.

(56) References Cited

U.S. PATENT DOCUMENTS

| 4,967,412 | A | * | 10/1990 | Cain et al. ................... 714/712 |
| 5,187,705 | A | * | 2/1993 | Mano .......................... 370/244 |
| 5,619,489 | A | * | 4/1997 | Chang et al. ............... 370/241 |
| 5,675,588 | A | * | 10/1997 | Maruyama et al. .......... 714/715 |
| 5,812,558 | A | | 9/1998 | Rotz |
| 5,983,287 | A | * | 11/1999 | Kuroiwa et al. ............... 710/14 |
| 6,011,830 | A | * | 1/2000 | Sasin et al. ............... 379/10.03 |
| 6,073,263 | A | * | 6/2000 | Arkin et al. ................. 714/738 |
| 6,157,615 | A | | 12/2000 | Akagawa |
| 6,201,829 | B1 | * | 3/2001 | Schneider .................... 375/221 |
| 6,381,269 | B1 | * | 4/2002 | Gradl et al. ................. 375/224 |
| 6,769,083 | B1 | * | 7/2004 | Tsuto et al. ................. 714/738 |
| 6,845,480 | B1 | * | 1/2005 | Wang .......................... 714/741 |
| 2002/0016937 | A1 | * | 2/2002 | Houh .......................... 714/43 |
| 2002/0037008 | A1 | | 3/2002 | Tagami |
| 2002/0037033 | A1 | * | 3/2002 | During ........................ 375/224 |

FOREIGN PATENT DOCUMENTS

DE    19518135    7/1996

* cited by examiner

*Primary Examiner*—Guy Lamarre
*Assistant Examiner*—John P. Trimmings
(74) *Attorney, Agent, or Firm*—Francis I. Gray; Matthew D. Rabdau

(57) ABSTRACT

A method for the dynamic control of the channel use of a transmission channel as well as a load generator for sending a test sequence generates the test sequence with several test patterns in accordance with a communication protocol to be used for transmission, preferably using a text editor and fixed definitions. A target channel use is defined. Then a predeterminable number of test patterns from the test sequence are sent and actual channel use is determined. Based on actual channel use a number of filler characters or a waiting time are determined for fixing the target channel use. Then the number of characters are sent or the waiting time is implemented until the next set of test patterns are sent. When all the test patterns of the test sequence have been sent, the transmission is terminated.

18 Claims, 2 Drawing Sheets

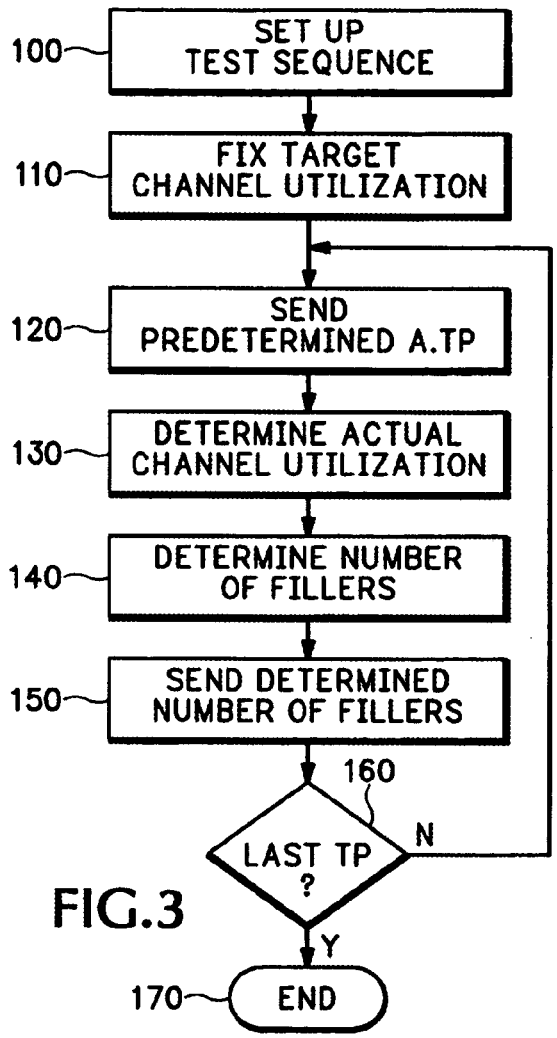
FIG.3
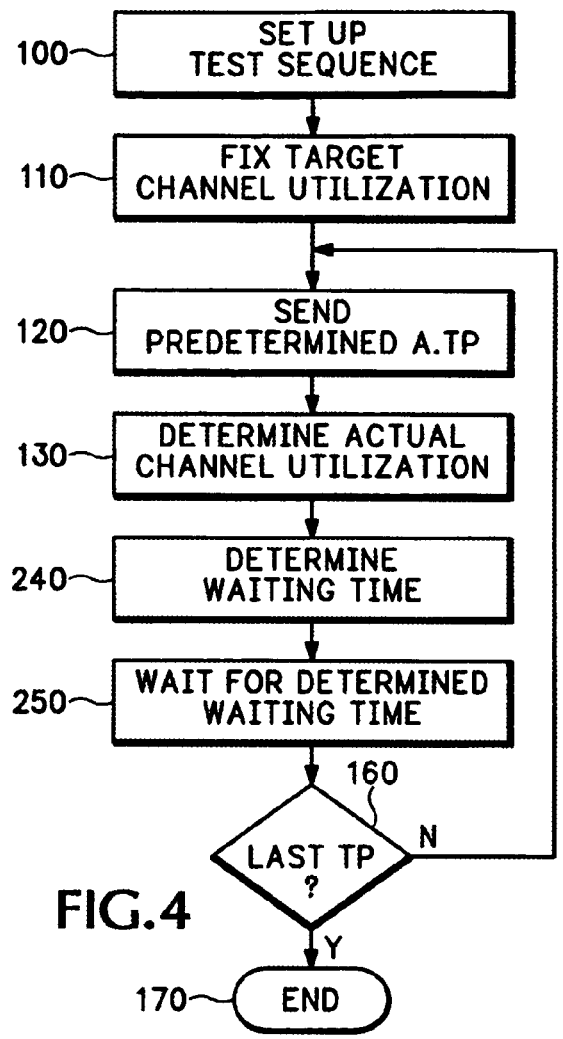
FIG.4
1:MSU_1:
0x01 0x33 ...;
2:MSU_2:
0x01 0x33 ...;
3:MSU_3:
0x01 0x33 ...;
4:LSSU_1:
0x00 0x01 0x00 0x00;
5:LSSU_2:
0x00 0x02 0x00 0x00;
FIG.5
R(2) P(4) P(5) E(0) P(1) P(2) R(20) P(3) E(0) E(0);
FIG.6

METHOD FOR THE DYNAMIC CONTROL OF THE CHANNEL USE OF A TRANSMISSION CHANNEL AND A LOAD GENERATOR FOR SENDING A TEST SEQUENCE

BACKGROUND OF THE INVENTION

The present invention relates to communications protocol testing, and more particularly to a method for the dynamic control of the channel use of a transmission channel during the sending of a test sequence, and to a load generator for sending the test sequence via the transmission channel.

It is common to generate test signals for examining communication hardware, and to operate the communication hardware with such test signals. To this end static test patterns were developed in the prior art separately for each communication hardware. Particularly tests relevant to practical conditions, for which the behavior at different channel uses was to be examined, could thus only be realized in a very awkward manner. In the prior art different test patterns had to be developed for realizing different channel uses. Thus critical channel uses were frequently overlooked because test data were only developed for a few discrete channel uses, not for channel uses lying inbetween.

What is desired is to improve the possibilities of testing communication hardware by providing the ability to test all channel uses.

BRIEF SUMMARY OF THE INVENTION

Accordingly the present invention provides a method for the dynamic control of the channel use of a transmission channel as well as a load generator for sending a test sequence. The test sequence is generated with several test patterns in accordance with a communication protocol to be used for transmission, preferably using a text editor and fixed definitions. A target channel use is defined. Then a predeterminable number of test patterns from the test sequence are sent and actual channel use is determined. Based on actual channel use a number of filler characters or a waiting time are determined for fixing the target channel use. Then the number of characters are sent or the waiting time is implemented until the next set of test patterns are sent. When all the test patterns of the test sequence have been sent, the transmission is terminated.

The objects, advantages and other novel features of the present invention are apparent from the following detailed description when read in conjunction with the appended claims and attached drawing.

BRIEF DESCRIPTION OF THE SEVERAL VIEWS OF THE DRAWING

FIG. 3 is a logic diagram view for performing a method of dynamic control of channel use using the load generator of FIG. 1 according to the present invention.

FIG. 4 is a logic diagram view for performing a method of dynamic control of channel use using the load generator of FIG. 2 according to the present invention.

FIG. 5 is an example of fixing definitions for test patterns according to the present invention.

FIG. 6 is an example of a test sequence from the definitions fixed in FIG. 5 according to the present invention.

DETAILED DESCRIPTION OF THE INVENTION

Figure 1:
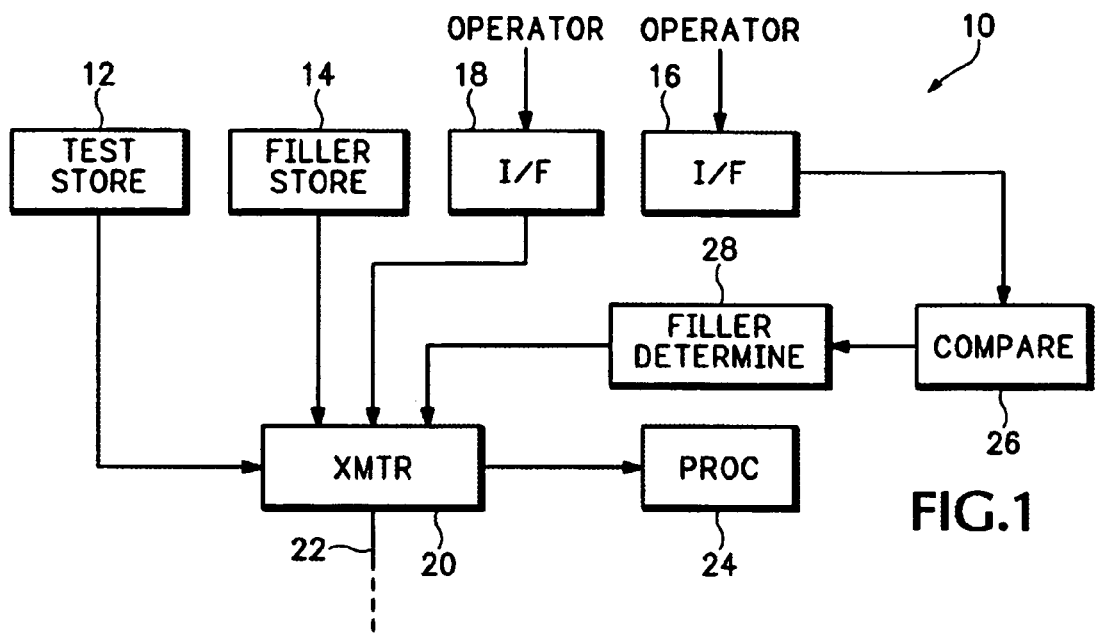
FIG. 1 is a block diagram view of a first embodiment of a load generator for sending a test sequence according to the present invention.

The present invention is based on the realization that an improvement of the testing of communication hardware is made possible by having a target channel use that is predeterminable by an operator, an actual channel use that is determined during the test, and depending on the difference by having either an appropriate number of filler characters transmitted or a corresponding waiting cycle observed before the next patterns of the test sequence are transmitted. This offers the possibility of a dynamic variation of the channel use without having to generate separate test data for each target channel use. This makes it possible to test large areas of channel uses in an extremely simple way, which also allows critical channel uses to be detected and appropriate countermeasures to be taken. This contributes decisively to developing reliable communication hardware.

The first step is the generation of a test sequence, which preferably is not carried out in real time but in a non-time-critical way before the start of transmission of the test data. Such generation may include the following partial steps: first the fixing of definitions for test patterns of the communication protocol to be used for the transmission, and then the compilation of a test sequence from the fixed definitions for test patterns. Repeat loops for one or several test patterns are definable in the compilation step. These partial steps are preferably performed using a text editor.

The next step is the fixing of a target channel use, also preferably performed in a non-critical-time way. This step may be continuously changeable by providing appropriate adjustment means that is operated by an operator. However via a corresponding software control, criteria may be determined for the variation of the target channel use to be tested, the distance of one target channel use to be tested to the next, and the time over which the corresponding target channel uses are to be adjusted and tested.

In the next step, which is carried out in real time for meaningful tests as are the following steps, the number of test patterns to be sent is predetermined, which may be one which allows testing very precisely the adjusted target channel uses, or may be larger than one which offers the possibility of testing communication hardware in a burst mode. The test sequence is decoded into a byte sequence with the aid of an interpreter and sent on the hardware envisioned for transmission. The test patterns are preferably numbered consecutively so they may be selected on the basis of the number assigned to them. This allows very complex test sequences to be produced in a very simple manner. A test sequence having several test patterns may be made up of instructions, such as "Repeat", "End Loop", "Start Loop", with a length of one character and an assigned parameter. The parameter may be a number assigned to the test pattern, a number of loop runs, or the designation of another test sequence. Such a description language may be used in connection with methods and load generators known from prior art, independent of the method described here.

The length of the patterns sent is determined in a number of bytes to account for different patterns having different lengths. For high accuracy measurements at very high transmission rates the execution times of machine commands, for example storage access and computation time, may also be considered in determining a number of filler characters to insert in the test sequence or a waiting time before transmission of the test pattern.

Referring now to FIGS. 1 and 3 a first embodiment of the method and load generator of the present invention is shown. As shown in FIG. 3 a test sequence is generated in step 100 and filed in a storage device 12 (FIG. 1). This may occur in a non-time-critical way in advance rather then real time. The generating of the test sequence is described below with reference to FIGS. 5 and 6.

Filler characters are filed in a filler character storage device 14. At a first operator interface 16 a target channel use is defined (step 110, FIG. 3). For this an operator is asked via a menu control to specify the lower target channel utilization, the upper target channel use, the distance from one target channel use to the next, and the duration during which the relevant target channel use is to be set. At a second operator interface 18 the operator defines after how many patterns of the test sequence an evaluation of the actual channel use takes place. After the entry of the relevant value, a transmitter 20 is started which sends the predetermined number of test patterns from step 120 along a transmission line 22. In step 130 the actual channel use is then determined in a processing unit 24. In a comparison unit 26 a comparison with the decisive target channel use provided by the first operator interface 16 is carried out. The comparison unit 26 transmits its result to a filler determination unit 28 that determines how many filler characters have to be inserted after the sent test patterns in order to set the target channel use (step 140). The transmitter 20 receives a corresponding signal from the filler determiner 28 and in step 150 sends a corresponding number of filler characters from the filler character storage 14. Then in step 160 whether or not the last test pattern has already been sent is checked. If test patterns are still waiting for transmission, the sequence jumps back to step 120, at which a predeterminable number of test patterns are sent again. If the last test pattern has already been sent, the transmission ends at step 170.

Figure 2:
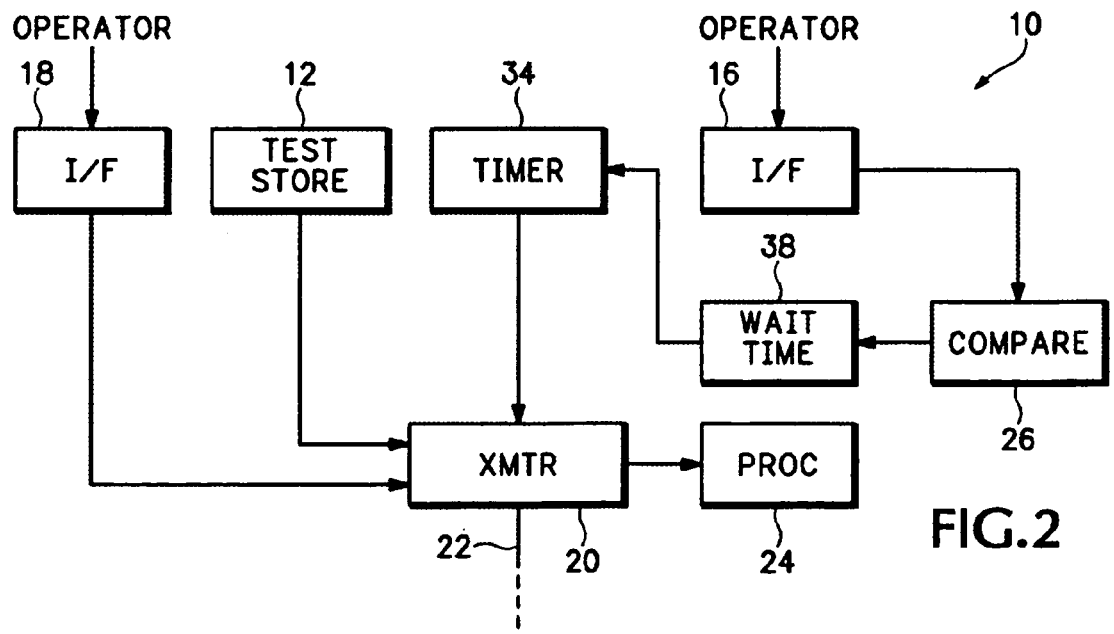
FIG. 2 is a block diagram view of a second embodiment of a load generator for sending a test sequence according to the present invention.

Referring now to FIGS. 2 and 4 only the differences from FIGS. 1 and 3 are described. The comparison unit 26 makes its result available to a waiting time unit 38 that determines the waiting time until the sending of the next test pattern in order to set the target channel use (see step 240, FIG. 4). The wait time unit 38 controls a timer 34 accordingly, which in turn causes the transmitter 20 to wait for the waiting time determined (step 250) before the next test patterns are sent.

Some hardware types, such as ATM hardware, themselves enter empty packets into the data stream during the transmission breaks created by these waiting times. In the case of ATM these are empty cells. However this is a requirement not realized through the hardware itself according to the present invention.

A description language is used for setting up complex test data sequences such that the data set up is sent on the standard hardware. An example is presented of a load generator for an SS7 signaling line. In the example test scenario the establishment of a connection with a few LSSU messages is simulated first. The test patterns and test sequences may be set up with a text editor and saved in simple ASCII files. An interpreter is capable of decoding the sequences—if it knows the communication protocol being used—in order to send the byte sequence on random hardware interfaces.

FIG. 5 shows the definition of test patterns with number 1 being assigned MSU_1 followed by a hexadecimal value. Numbers 2 and 3 for MSU_2 and MSU_3 are set up similarly. Number 4 defines LSSU_1 and number 5 defines LSSU_2 with corresponding hexadecimal assignments. FIG. 6 shows an associated test sequence: R(2) means that the following test sequence, patterns P(4) and P(5), are sent twice. E indicates the end of the repeat loop opened by R. The parameter behind E is of no influence. Patterns P(1) and P(2) are then sent followed by pattern P(3) being repeated twenty times R(20). The two final E instructions end first the R(20) repeat loop and then the entire sequence.

According to FIG. 1 variability is realized by the fact that, depending on the target channel use set, either no filler characters or one or several filler characters are sent after a predeterminable number of test patterns. For an Ethernet application the load generator shown in FIG. 2 is used so the system waits for the determined time after the sending of a certain number of ARP messages before further ARP messages are sent. Of course the invention may be used for other Ethernet protocols, such as IP, ICMP, RIP, etc.

Apart from setting up the test sequences which are sent via the above description language, other methods are also available for consideration, i.e., the evaluation of a recording file, manual entry using a keyboard, or other creation possibilities via software. For the use on broadband hardware, such as 100 Mbits/s Ethernet, it is preferred to also take into account the execution times of the machine commands when determining the number of filler characters to be sent and the waiting time.

Thus the present invention provides a method for the dynamic control of the channel use of a transmission channel as well as a load generator for sending a test sequence, the test sequence being generated from fixed definitions and including a plurality of test patterns and a target channel use being defined, by sending a predetermined number of test patterns from the test sequence, by determining actual channel use, by determining a number of filler characters or waiting time to be implemented before the next number of test patterns is sent, and by terminating the transmission when all the test patterns of the test sequence have been sent.

What is claimed is:

1. A method for the dynamic control of the channel use of a transmission channel during the sending of a test sequence comprising the steps of:
    a) generating the test sequence having several test patterns in accordance with a communication protocol to be used for transmission;
    b) defining a target channel use;
    c) sending a predeterminable number of test patterns of the test sequence;
    d) determining actual channel use;
    e) determining a number of filler characters to be sent for setting the target channel use;
    f) sending the determined number of filler characters; and
    g) terminating the transmission if all test patterns of the test sequence have been sent, otherwise repeating steps c)–g).

2. The method as recited in claim 1 wherein steps e) and f) are replaced by the steps of:
    h) determining a waiting time for setting the target channel use; and
    i) implementing the waiting time.

3. The method as recited in claims 1 or 2 wherein steps a) and b) are performed in a non-time-critical way.

4. The method as recited in claim 3 wherein the defining step provides a continuously changeable target channel use.

5. The method as recited in claims 1 or 2 wherein the predeterminable number of test patterns comprises one.

6. The method as recited in claims 1 or 2 wherein the predeterminable number of test patterns comprises more than one.

7. The method as recited in claims 1 or 2 wherein the generating step comprises the steps of:
   a1) fixing definitions for test patterns of the communication protocol to be used for the transmission; and
   a2) compiling the test sequence from the definitions for the test patterns.

8. The method as recited in claim 7 wherein the compiling step comprises the step of defining repeat loops for one or more of the test patterns.

9. The method as recited in claim 8 wherein the fixing and compiling steps are performed using a text editor.

10. The method as recited in claim 9 wherein the sending a predetermined number of test patterns of the test sequence step comprises the steps of:
    c1) decoding the test sequence into a byte sequence using an interpreter; and
    c2) sending the byte sequence on hardware envisioned for the transmission.

11. The method as recited in claim 7 wherein the test patterns are numbered consecutively and are selected by the number assigned to them.

12. The method as recited in claim 11 wherein the test sequence comprises instructions selected from the group consisting of Repeat, End Loop and Start Loop where each instruction has a length of one character and an assigned parameter.

13. The method as recited in claim 12 wherein the assigned parameter comprises a number selected from the group consisting of a number assigned to one of the test patterns, a number of loop runs and a designation of another test sequence.

14. The method as recited in claims 1 or 2 wherein the actual channel use determining step comprises the step of:
   d1) determining a length of the test patterns in a number of bytes.

15. The method as recited in claim 1 wherein the number determining step comprises the step of:
   e1) taking into account execution times of machine commands.

16. The method as recited in claim 2 wherein the waiting time determining step comprises the step of:
   h1) taking into account execution times of machine commands.

17. A load generator for sending a test sequence via a transmission channel comprising:
   a first device for storing the test sequence, which test sequence has several test patterns according to a communication protocol to be used for transmission;
   a second device for defining a target channel use;
   a third device coupled to the first device for sending a predeterminable number of test patterns of the test sequence;
   a fourth device coupled to the third device for determining an actual channel use; and
   a fifth device coupled between the second device and the third device for determining a number of filler characters to be sent to set the target channel use, the third device sending the determined number of filler characters before further test patterns are sent.

18. The load generator as recited in claim 17 wherein the fifth device comprises:
   a sixth device coupled to the second device for determining a waiting time in lieu of a number of filler characters; and
   a seventh device coupled between the sixth device and the third device for implementing the waiting time before further test patterns are sent.

* * * * *